United States Patent [19] [11] 4,051,652
Hirano et al. [45] Oct. 4, 1977

[54] METHOD AND APPARATUS FOR PACKAGING YARN PACKAGES DOFFED FROM A YARN PRODUCING MACHINE

[75] Inventors: Satoru Hirano, Kyoto; Atsushi Kubota, Kobe; Mitsuru Yoshida, Kawanishi; Junzi Mizuno, Sabae; Nobutaka Miyamoto, Sakai, all of Japan

[73] Assignee: Kanebo, Limited, Japan

[21] Appl. No.: 766,146

[22] Filed: Feb. 7, 1977

[30] Foreign Application Priority Data

| Feb. 9, 1976 | Japan | 51-13770 |
| Feb. 9, 1976 | Japan | 51-13771 |
| Apr. 27, 1976 | Japan | 51-48815 |
| Apr. 30, 1976 | Japan | 51-50159 |
| May 25, 1976 | Japan | 51-60991 |

[51] Int. Cl.² .......................................... D01H 9/00
[52] U.S. Cl. ............................................ 57/52; 53/3; 53/142; 53/167; 53/203; 57/34 R; 57/53; 57/156
[58] Field of Search ............... 57/52, 53, 54, 34 R, 57/156; 53/3, 142, 167, 203, 197, 235, 246

[56] References Cited
U.S. PATENT DOCUMENTS

| 2,505,427 | 4/1950 | Peterson | 53/197 |
| 3,290,857 | 12/1966 | Nydam | 53/142 X |
| 3,403,494 | 10/1968 | Livingston | 53/246 |
| 3,433,006 | 3/1969 | Hamahata | 57/53 |

Primary Examiner—John Petrakes
Attorney, Agent, or Firm—Paul & Paul

[57] ABSTRACT

Method for packaging in a carton full size yarn packages by a yarn producing machine provided with a plurality of yarn package producing units. A predetermined number of full size yarn packages are firstly doffed from the corresponding spindles of the yarn producing machine at once by means of the bobbins chucks which are displaceable as one group, and each doffed yarn package is wrapped separately by a film bag while holding by the corresponding bobbin chuck. Next the yarn packages wrapped with the corresponding film bags are deposited at once into a space of a carton by displacing the bobbin chucks, and after releasing the gripping of the yarn packages by the respective bobbin chucks, these bobbin chucks are displaced to their standby positions. The pitch between each two adjacent bobbin chucks is changed from the spindle pitch to the pitch for depositing the yarn packages into the carton, just before the operation for wrapping each yarn package by a film bag or the operation for depositing the wrapped yarn packages into the carton. The above-mentioned operation is repeated for carrying out the doffing operation for all spindles of the yarn producing machine.

16 Claims, 30 Drawing Figures

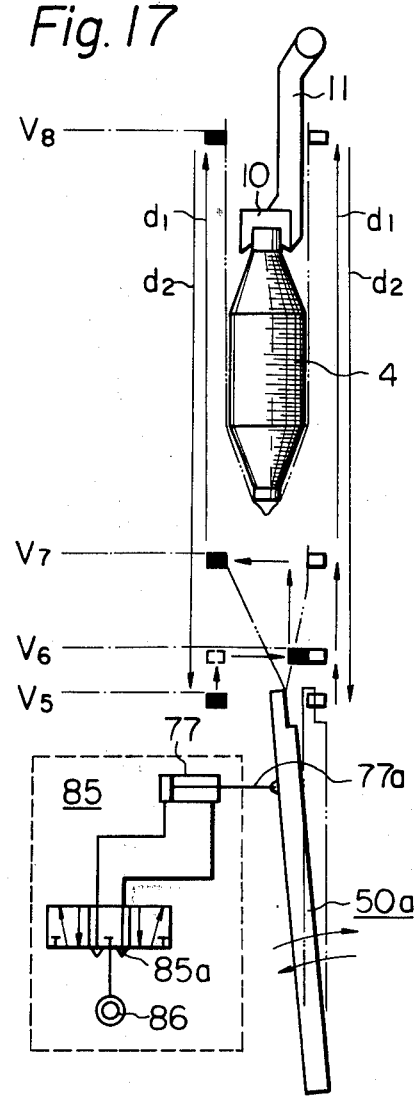

METHOD AND APPARATUS FOR PACKAGING YARN PACKAGES DOFFED FROM A YARN PRODUCING MACHINE

SUMMARY OF THE INVENTION

The present invention relates to a method and apparatus for packaging yarn packages doffed from a yarn producing machine provided with a plurality of yarn producing units, wherein the packaging operation is carried out in direct relation to an operation for doffing full size yarn packages from the respective yarn producing units and each doffed yarn package is positioned in a film bag, and thereafter, a predetermined number of the yarn packages wrapped separately by film bags are packaged in a carton.

Various severe conditions have heretofore been imposed on transportation of yarn packages, especially yarn packages of synthetic filaments, in order to prevent any possible degradation of the quality during transportation. In general, these yarn packages are individually wrapped in bags of synthetic resin film such as polyethylene and polypropylene film and a plurality of wrapped yarn packages are packaged into a carton having the interior space defined by partition plates. According to this packaging method, however, yarn packages are first transported from a yarn producing machine, such as a draw-twister, to a packaging position located away from the yarn producing machine and, then, they are subjected to the packaging operation. Further, this packaging operation requires many manual operations. Accordingly, the conventional yarn packaging method is defective in that it requires a large amount of manual labor and space, and further, the stock of yarn packages is readily increasing unnecessarily.

It is, therefore, a principal object of the present invention to provide a method for packaging yarn packages in which the above-mentioned problems involved in the conventional method can be obviated and the packaging operation can be performed at high efficiency, and to provide an apparatus for working this yarn package-packaging method.

To attain the purpose of the present invention, a predetermined number of full size yarn packages are firstly doffed from the respective yarn producing units of the yarn producing machine at one time. Then, each of the doffed yarn packages is independently and simultaneously wrapped with a corresponding wrapping bag made of a synthetic film. Thereafter, the wrapped yarn packages are simultaneously deposited vertically into receiving spaces formed in a carton. Then, if necessary, the above described operations are applied to the next group of yarn producing units, adjacently, positioned to the group of yarn producing units to which the above-mentioned doffing operation was applied and finally the carton is sealed. In the above described packaging operation method, each doffed yarn package is deposited into the respective film bag with the film bag having its aperture positively opened upward, the film bags being taken from a film stock box disposed at respective positions adjacent to the corresponding wrapping positions. In the doffing operation, a group of bobbin chucks are utilized for holding yarn packages for example four bobbin chucks are utilized for holding four yarn packages, formed on the respective yarn producing units. The bobbin chucks are capable of moving up and down and along a horizontal passage thereof. The bobbin chucks are also capable of stopping at several predetermined positions for the carrying out of the above-mentioned wrapping operation by film bags and positioning operation of the wrapped yarn packages in the predetermined space of the carton.

Therefore, in a pertinent embodiment of the apparatus according to the present invention, the apparatus comprises: bobbin chucks which are capable of simultaneously shifting a plurality of doffed yarn packages in the horizontal and vertical directions in such a condition that each yarn package is held by and suspended from a corresponding bobbin chuck; a plurality of film bag holding means, the number of which is identical to the number of the above-mentioned bobbin chucks, each film bag holding means comprising a pair of film bag holding members provided with adhesive faces for catching opposite side portions of a film bag in such a condition that opposite side portions of the film bag can be spaced by displacing the holding members towards the opposite directions each other from; lift means for moving these film bag holding means up and down simultaneously; a film bag feed mechanism for supplying film bags separately to each film bag holding means; a carton box shifting mechanism for temporarily holding the carton box at a working position for carrying out the packaging operation and for discharging a carton for which the packaging operation from the apparatus has been completed; a programming control means for systematically carrying out the doffing and yarn package-packaging operation into a carbon box, and; auxiliary means, such as a mechanism for correctly positioning the apparatus of the present invention before the corresponding yarn producing units of the yarn producing machine.

BRIEF EXPLANATION OF THE DRAWINGS

FIG. 17 is a schematic side view of the film bag supply mechanism in a relation to a bobbin chuck, which is utilized for the apparatus shown in FIG. 1, FIGS. 18A, 18B, 18C, 18D, 18E and 18F are schematic side views of the film bag supply magazine in the successive steps for operating the magazine, shown in FIGS. 15 and 16.

DETAILED EXPLANATION OF THE INVENTION

Figure 1:
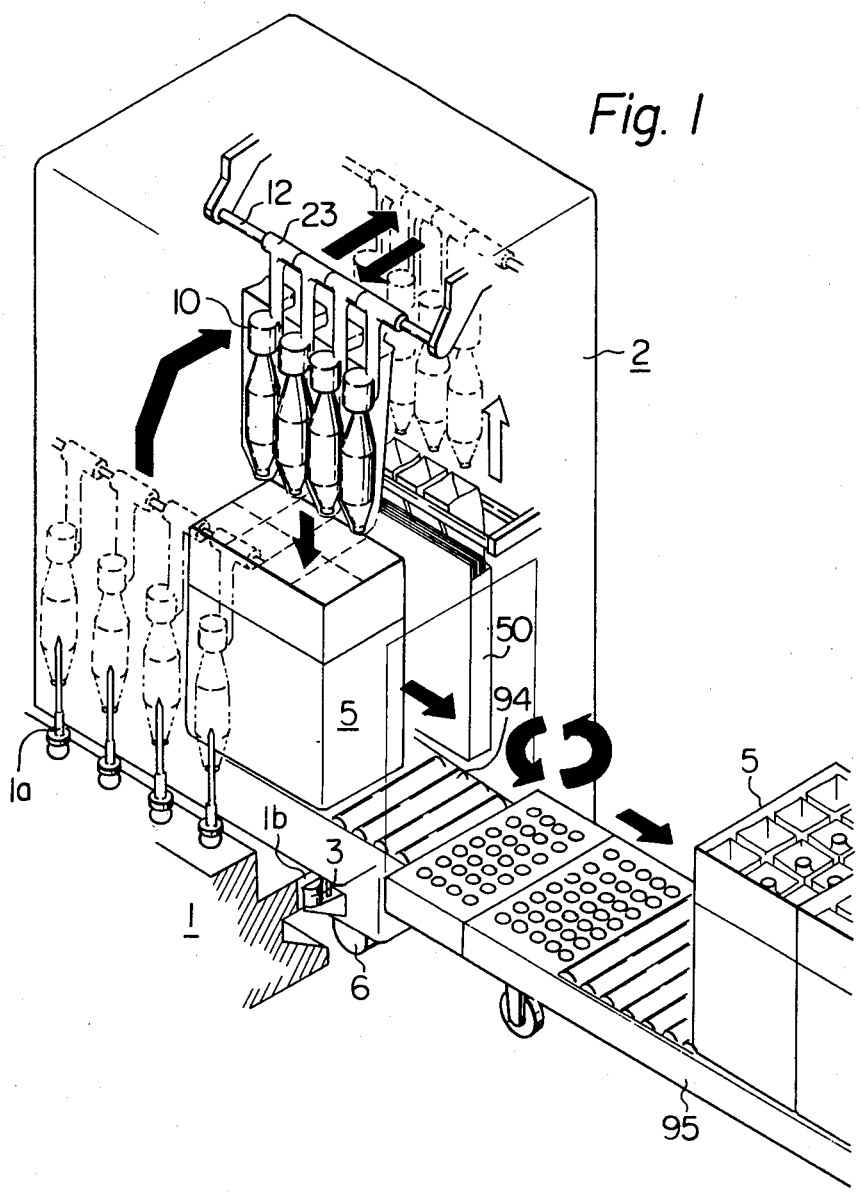
FIG. 1 is a perspective view of an embodiment of the packaging apparatus according to the present invention.

General construction of the packaging apparatus.

The general construction of the packaging apparatus according to the present invention will firstly be explained by describing an embodiment of the apparatus adopted for doffing the full sized yarn packages produced by a conventional draw-twister provided with a plurality of spindles aligned along the lengthwise direction of the draw-twister. In this embodiment, shown in FIGS. 1, 2 and 3, a group of full sized yarn packages 4 formed on respective spindles 1a of a draw-twister 1, each group consisting of four yarn packages, are intermittently and simultaneously doffed from the respective spindles 1a by corresponding bobbin chucks 10 of a packaging apparatus 2 of the invention. The doffed yarn packages 4 are positioned in a carton box 5 mounted on the apparatus 2. The apparatus 2 is provided with a pair of guide wheels 3 rotatably disposed at a front bottom side thereof in such a condition that these guide wheels 3 are capable of running along a guide rail 1b disposed on the draw-twister 1. Since the guide rail 1b is disposed at a bottom front side of the draw-twister 1 in parallel condition to the spindle alignment, and the apparatus 2 is provided with two pairs of wheels 6a and 6b which are capable of running on a floor 7 whereon the draw-twister 1 is installed, the apparatus 2 is capable displacing along the spindle alignment of the draw-twister 1.

The two wheels 6a are secured on a shaft 8 which is capable of being positively driven by a driving means 9 disposed on the apparatus 2. The apparatus 2 is also provided with an automatic positioning means (not shown) which works to correctly stop the apparatus 2 at its desired working position in a relation with a dog-means (not shown) disposed on the draw-twister 1. As to this positioning means, the automatic mechanism disclosed in the U.S. Pat. No. 3,433,006, related to "Apparatus for Exchanging Bobbins in Textile Machine", can be utilized without large modification of the mechanism and, therefore, a detailed explanation thereof is omitted. The doffing and packaging operation by the apparatus 2 is intermittently carried out in such a condition that the apparatus 2 is firstly stopped at a position facing a group of four spindles which are positioned at the most adjacent side to a gear end frame or an outer-end frame of the draw-twister 1. After completion of one cycle of an operation consisting of the doffing operation for four spindles and the packaging operation applied to the doffed yarn packages into a carton 5, the apparatus 2 is displaced to the successive working position facing the next four spindles 1a of the draw-twister 1 so as to carry out the next doffing and packaging operation with respect to these latter four spindles 1a. Such intermittent operation of the apparatus 2 is carried out for all spindles 1a of the draw-twister 1. Consequently, the apparatus 2 is intermittently displaced along the spindle alignment of the draw-twister 1 and the above-mentioned automatic positioning means works to correctly position the apparatus 2 at the above-mentioned predetermined positions, respectively. According to the present invention, these operations can be conducted automatically.

The main parts of the apparatus 2 of the present invention are as follows.

A. Bobbin chuck mechanism (including bobbin chucks, a mechanism for changing the pitch between two adjacent bobbins and a chuck shifting mechanism).

B. Mechanism for individually wrapping yarn packages in the respective film bags (including a film bag holding and opening mechanism and a lift mechanism).

C. Film bag supplying mechanism.

D. Carton box delivery mechanism.

E. Programming control means for systematically carrying out the doffing and packaging operation.

The above-mentioned mechanisms A, B, C and E are mounted on a doffing device running in front of a draw-twister so that they perform a series of related operations, and the mechanism D is used according to need in the state connected to the doffing device.

Each of the foregoing five mechanisms will now be described in detail.

A. Bobbin Chuck Mechanism

In the apparatus 2 shown in FIGS. 1 through 5, a plurality of bobbin chucks 10 (4 chucks in the embodiment shown in the drawings) are supported through an arm 11 on a rod 12 disposed in parallel to rows of spindles 1a of the draw-twister 1. The space between every two adjacent bobbin chucks 10 can be adjusted depending on the spindle pitch $P_1$ of the draw-twister 1 and the yarn package storing pitch $P_2$ in the carbon box 5 by a pitch changing mechanism described hereinafter. In general, the yarn package storing pitch $P_2$ is narrower than the spindle pitch $P_1$ and, therefore, the above adjustment of the supporting space between adjacent bobbin chucks 10 is necessary.

The rod 12 can be moved in either the horizontal direction or the vertical direction along a pair of vertical pillars 13 and a pair of guide rails 14, respectively, by a shifting mechanism described hereinafter, so that the bobbin chucks 10 can be shifted to optional positions (see FIG. 1). The rod 12 is horizontally supported by a horizontal bracket 12a provided with a pair of horizontal arms 12b and a connection 12c which connects the horizontal arms 12b. These arms 12b are slidably engaged in the respective guide grooves 14a formed in the respective guide rails 14.

Figure 6:
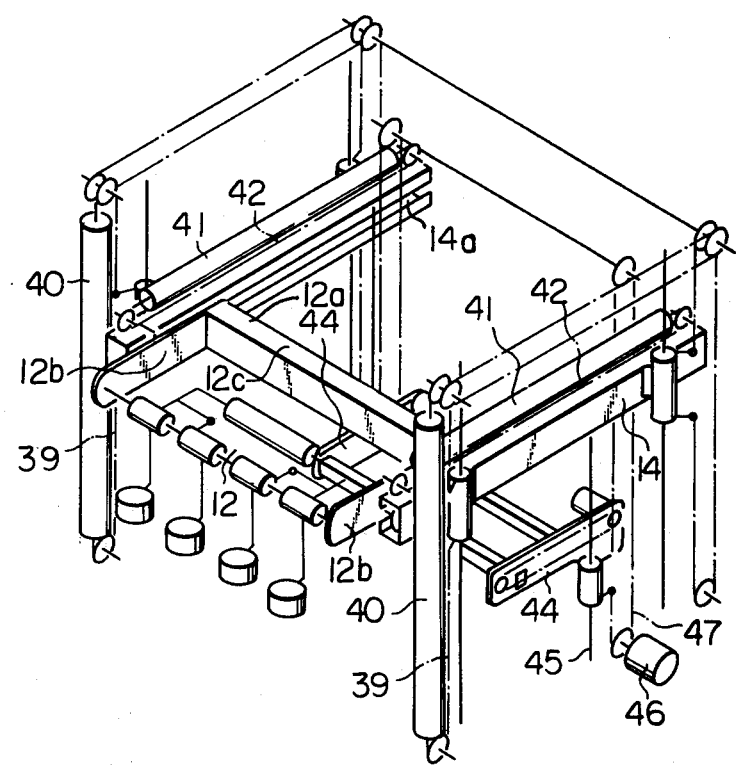
FIG. 6 is a schematic perspective view of the mechanism for displacing the bobbin chucks, utilized for the apparatus shown in FIG. 1.

The above-mentioned vertical pillars 13 and guide rails 14 are disposed in the apparatus 2 in a relation as shown in FIG. 6.

Figure 4:
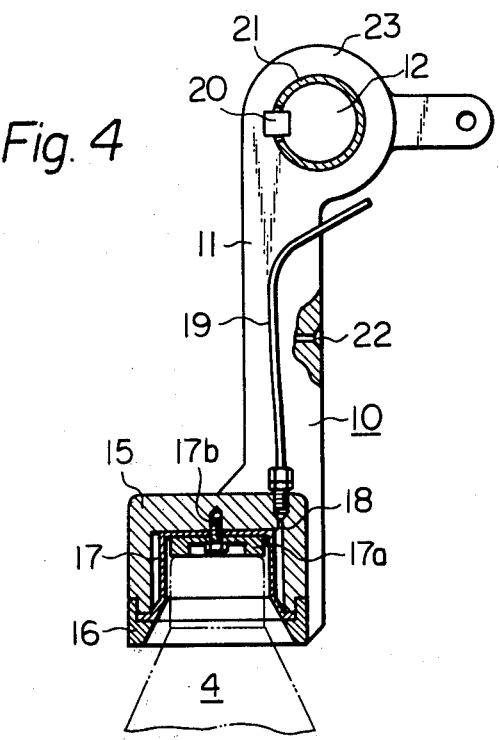
FIG. 4 is a schematic side view, partly in section, of a bobbin chuck utilized for the apparatus shown in FIG. 1.

Referring to FIG. 4, wherein a detailed structure of the bobbin chuck 10 and the arm 11 are shown, the bobbin chuck 10 comprises a cyclindrical cap 15 composed of a material having a high rigidity, an annular press lid 16 fitted in the bottom end of the cap 15 and a bag member 17 composed of an elastic material such as rubber. The bag member 17 is gripped and supported by means of a supported plate 17a, which is secured to the top body portion of the cap 15 by a bolt 17b, at a position between the inside wall of the cap 15 and the press lid 16 so that the inner circumferential wall of the cap 15 is closely covered with the bag member 17. A boss 23 formed at a top end portion of the arm 11 is slidably mounted on the rod 12 in a condition of spline engagement by means of a key 20 secured to a sliding bearing 21.

The bobbin chuck 10 having the above structure is operated in the following manner.

When the cap 15 contacts the head of the yarn package 4, compressed air is introduced through the aperture 18 to inflate the bag 17 positioned inside the cap 15, so that the head of the yarn package 4 is firmly gripped by the inflated bag member 17 from the periphery thereof. When air in the bag 17 is discharged through the aperture 18, the yarn package 4 is released from this holding action.

An attracting aperture 22 connected to a vacuum source (not shown) is formed in the back face portion of the arm 11. This attracting aperture 22 has a function of temporarily holding a film bag delivered member as described hereinafter.

The Pitch Changing Mechanism is hereinafter explained in detail.

Figure 5:
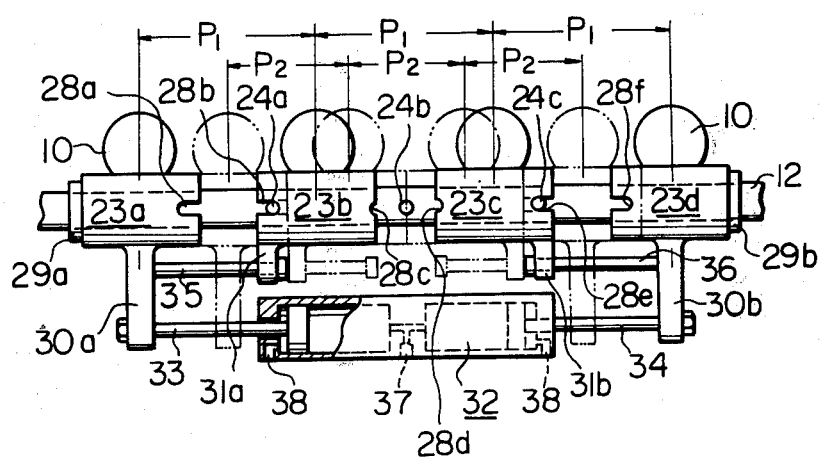
FIG. 5 is elevational view, partly in section, of a mechanism for changing the distance between each two adjacent bobbin chucks, utilized for the apparatus shown in FIG. 1.

The arm 11 supporting the bobbin chuck 10 is slidably mounted on the rod 12 as previously explained. As pointed out hereinbefore, among the bobbin chucks 10a, 10b, 10c and 10d, the intervened spaces between every two adjacent bobbin chucks must be changed if these spaces are required to coincide with the spindle pitch $P_1$ or the yarn package storing pitch $P_2$. The boss 23 of each arm 11 has a certain length in the axial direction, and when bobbin chucks 10 are brought close to each other and the bosses fall in contact with each other, they act as spacers for keeping the pitch between the two adjacent bobbin chucks 10 equal to the yarn package storing pitch $P_2$. In FIG. 5, these bosses are represented by 23a, 23b, 23c and 23d, respectively.

In the rod 12, pins 24a, 24b and 24c are projected at positions between every two adjacent bosses (23a, 23b, 23c and 23d). A groove 28a is formed in an inside edge portion of the boss 23a in such a condition that it is capable of engaging with the pin 24a; a groove 28b is formed in an outside edge portion of the boss 23b in such a condition, that it is capable of engaging with the pin 24a; a groove 28c is formed in an inside edge portion of the boss 23b in such a condition that it is capable of engaging with the pin 24b; a groove 28d is formed in an inside edge portion of the boss 23c in such a condition that it is capable of engaging with the pin 24b; a groove 28e is formed in an outside edge portion of the boss 23c in such a condition that it is capable of engaging with the pin 24c, and; a groove 28f is formed in an inside edge portion of the boss 23d in such a condition that it is capable of engaging with the pin 24c. A pair of positioning collars 29a, 29b are fixed to the rod 12 to restrict the maximum sliding range of bosses 23a and 23d located on the two ends of the rod 12. The bosses 23a and 23d on the two ends of the rod 12 are provided with long brackets 30a, 30b projected therefrom respectively, and the intermediate bosses 23a and 23b are provided with short brackets 31a, 31b projected therefrom respectively. The long brackets 30a, 30b are integrally connected to left and right piston rods 33 and 34, respectively, of an air cylinder 32, and the short brackets 31a, 31b are movably mounted on short rods 35 and 36, respectively.

When air is supplied from a central air supply aperture 37 of the air cylinder 32, the piston rod 33 is moved to the left and the boss 23a is slid on the rod 12 and stopped by the positioning collar 29a. During this movement, the short rod 35 drags the boss 23b through the short bracket 31a but the boss 23b is stopped in the middle of this movement at the prescribed position by the engagement of the pin 24a with the terminal of the groove 28b.

Also the bosses 23c and 23d on the right side are moved to the right in the same manner as described above and stopped at the prescribed positions. When the positions of the respective pins 24a and 24c and the length of the grooves 28b, 28e are appropriately set, the respective bosses 23a, 23b, 23c and 23d, namely the respective bobbin chucks 10, are arranged in such a condition that a spacing corresponding to the spindle pitch $P_1$ is formed between every two adjacent bobbin chuck 10.

When air is supplied from the left and right air supply apertures 38 of the air cylinder 32 and air is discharged from the central air aperture 37, according to a motion reverse to the above-mentioned motion, the respective bosses 23a, 23b, 23c and 23d are gathered toward the center projected pin 24b as follows. That is, the rod 33 is retracted into the cylinder 37 so that the bracket 30a, that is the boss 23a is firstly displaced toward the pin 24a and the boss 23a contacts the boss 23b. When the rod 33 is further retracted into the air cylinder 37, the boss 23a is further displaced toward the pin 24b. In this condition, the pin 24a is displaced from the groove 28b into the groove 28a and the bosses 23a and 23b, which contacts the boss 23a, are further displaced toward the pin 24b. Finally, these bosses 23a and 23b are stopped when the pin 24b contacts the inside terminal of the groove 28c. The bosses 23c and 23d are also displaced toward the pin 24b and stopped when the pin 24b contacts the inside terminal of the groove 28d, in the same way as the motion of the bosses 23a and 23b. Consequently, a spacing corresponding to the yarn package storing pitch $P_2$ is formed between every two adjacent bobbin chucks 10.

The bobbin chuck shifting mechanism for shifting yarn packages to respective operation positions will now be described by reference to FIG. 6.

The frame of the above-mentioned pitch changing mechanism including the bobbin chucks 10 is supported on a pair of guide rails 14 laid out in the horizontal direction. These guide rails 14 are arranged so that the ends of the rails 14 can slide on pillars 13 laid out in the vertical direction. Further, the ends of the guide rails 14 are connected to a pair of endless chains 39 which are connected with pistons of cable cylinders 40 fixed in parallel to the chains 39. By this arrangement, the rails 14 can be shifted in the vertical direction along the vertical pillars 13 by synchronous movements of a pair of the cable cylinders 40.

Further, cable cylinders 41 and endless chains 42 engaged with pistons of the cylinders 41 are supported on the rails 14 and the frame of the above-mentioned pitch changing mechanism is connected to the chains 42, so that the pitch changing mechanism can be shifted in the horizontal direction along guides mounted on the rails 14.

By the above-mentioned shifting mechanism, bobbin chucks 10 can be freely shifted from just above the spindles of the draw-twister 1 onto the film bag storing box 50 and to the carton box 5.

Figure 2:
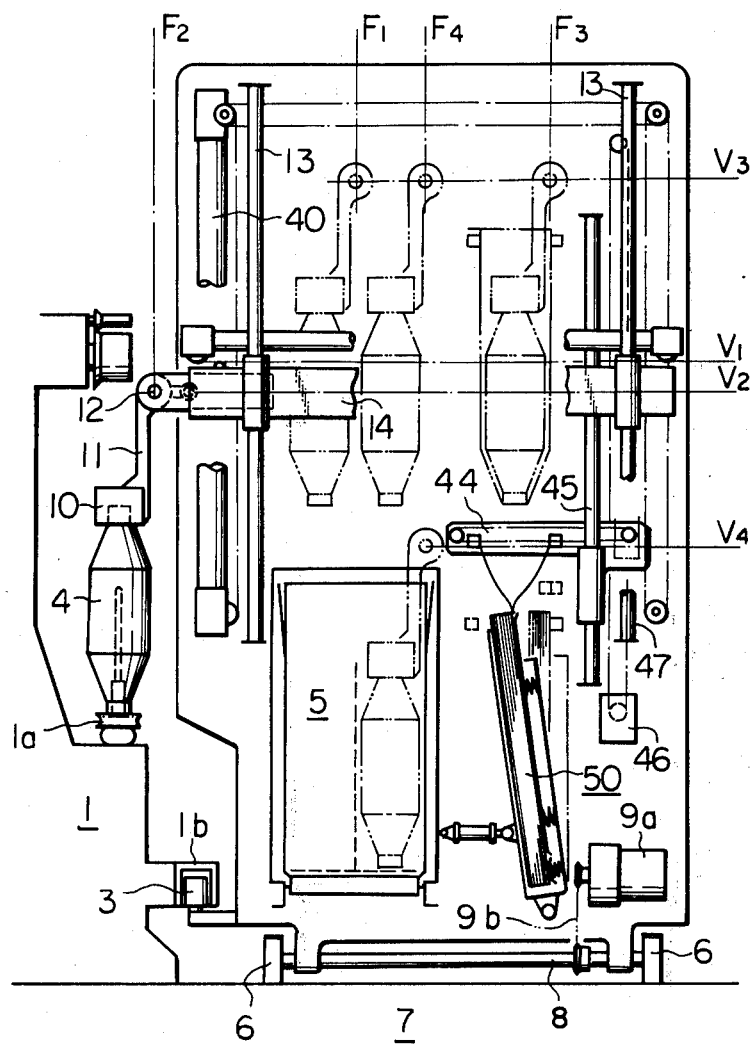
FIG. 2 is a schematic side view of a main part of the apparatus shown in FIG. 1.
Figure 3:
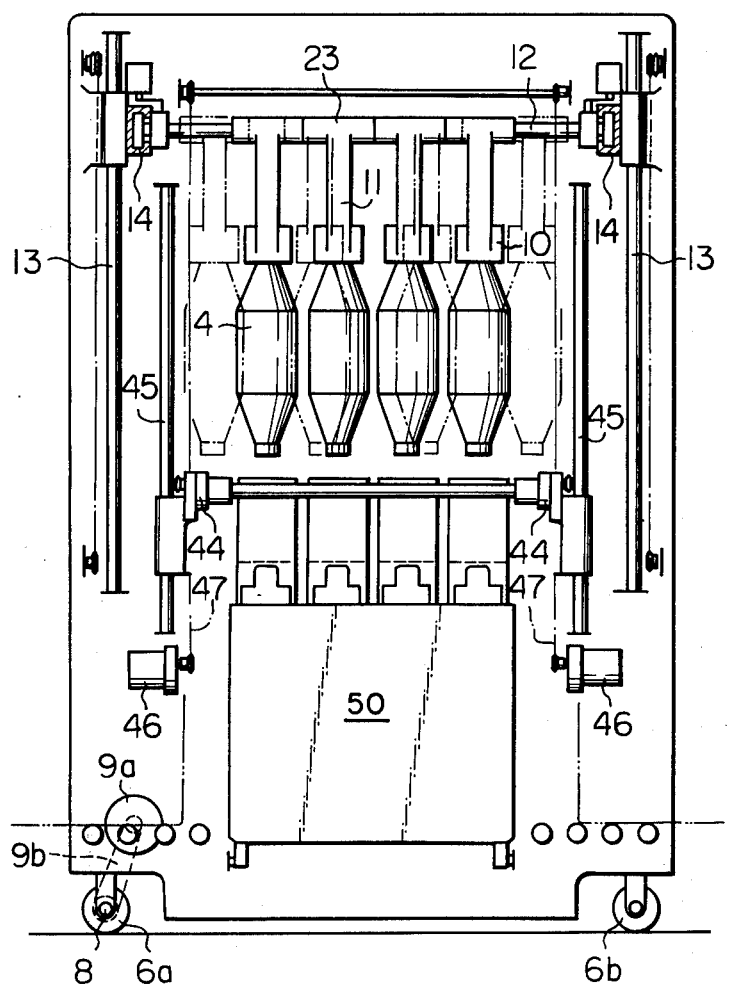
FIG. 3 is a schematic front view of the main part of the apparatus shown in FIG. 2.

During the operation of the bobbin chuck mechanism shown in FIGS. 2, 3 and 4 in cooperation with the mechanism for changing the pitch between two adjacent bobbins, chuck shifting is automatically carried out by a chuck shifting mechanism shown in FIGS. 5 and 6 under a control action of a programming control means (not shown), in a relation with the above-mentioned wrapping operation of the doffed yarn packages by the respective film bags. One complete cycle of the operation of the bobbin chuck mechanism, the mechanism for changing the pitch between two adjacent bobbins and the chuck shifting mechanism is hereinafter explained in detail (FIGS. 1 through 7).

When full size yarn packages 4 are formed on the spindles 1a of the draw-twister 1, the apparatus 2 of the invention is carried to its doffing position in front of the spindle alignment of the draw-twister and positioned at a doffing position in front of the corresponding spindles 1a from which the full size yarn packages 4 (in this embodiment four yarn packages) are to be doffed. Thereafter, the steps of the doffing operation and motions for packaging are carried out as explained below. In the following explanation, the motion of one bobbin chuck 10 is explained for the sake of easy understanding of the invention, and the position or level of the bobbin chuck 10 are represented by the position or level of the central axis of the horizontal rod 12 in FIG. 2.

I. First step

Each bobbin chuck 10 is firstly displaced from its standby position $F_1$ to the forwarded position $F_2$ in a period from a time point $t_1$ to a time point $t_2$. During this motion of the chuck 10, the level thereof is maintained at a level $V_1$ which is a standby level thereof and the holding action of each bobbin chuck 10 is maintained in a releasing condition.

ii. Second step

When each bobbin chuck 10 arrives at the forwarded position thereof, where each bobbin chuck 10 is positioned right above the head of the corresponding spindle 1a, the downward motion of each bobbin chuck 10 toward the corresponding spindle 1a of the draw-twister is carried out from the level $V_1$ to a level $V_2$, where the head of the bobbin of each full size yarn package 4 supported by the corresponding spindle 1a is inserted into a cylindrical recess of the bobbin chuck 10. This motion is completed at the time point $t_3$.

iii. Third step

Figure 7:
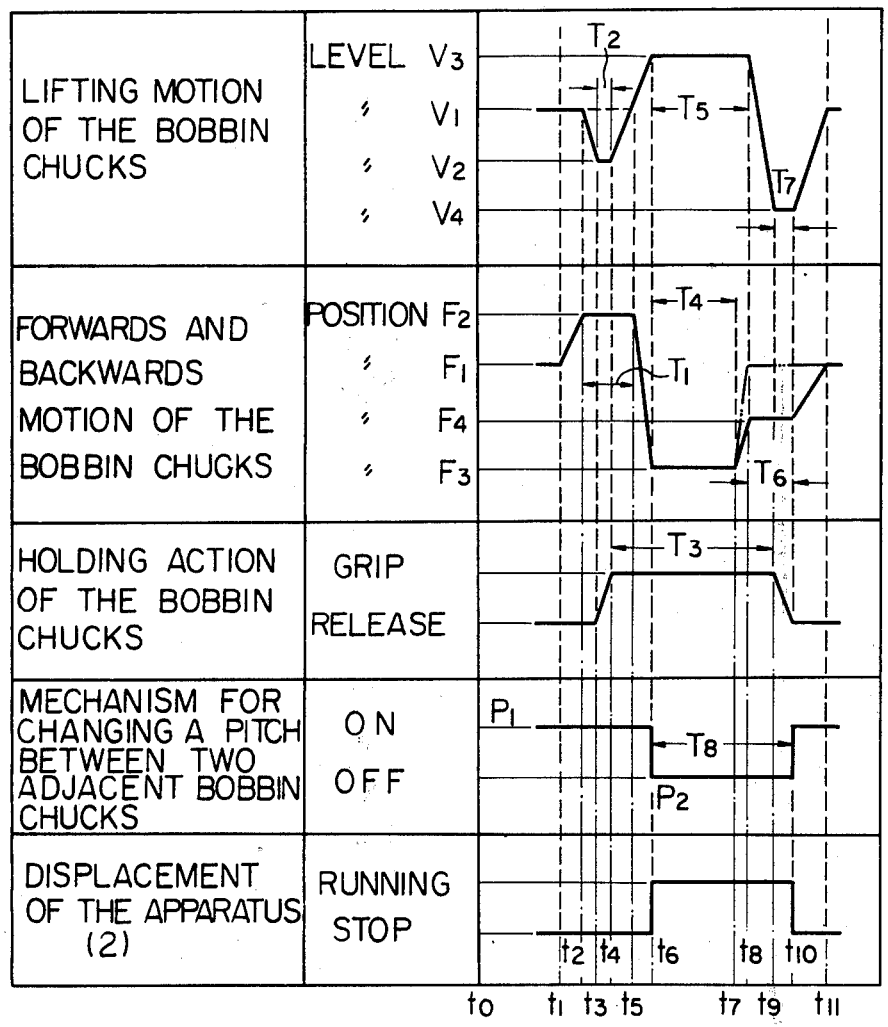
FIG. 7 is a chart indicating the programming of the motions of the bobbin chucks and the related motions thereof which are applied for carrying out the operation according to the present invention.

At the time point $t_3$, the level of the bobbin chucks 10 is $V_2$ at the forward position $F_2$. In this condition, compressed air is supplied into the bobbin chuck 10 by way of the conduit 19 (FIG. 4) so that the bag member 17 is inflated toward the inside of the chuck 10. As a result, the bobbin chuck 10 grips the head of the bobbin head of the full size yarn package 4. Therefore, as shown in FIG. 7, at the time point $t_4$, the full size yarn package 4 is stably and firmly gripped by the corresponding bobbin chuck 10.

iv. Fourth step

In the above mentioned gripped condition of the full size yarn package 4, the bobbin chucks 10 are displaced upward from a level $V_2$ to the level $V_3$. This motion is carried out in a period between the time point $t_4$ to the time point $t_6$, while the bobbin chucks 10 are maintained in their positions $F_2$ right above the corresponding spindles 1a until the time point $t_5$. At the time point $t_5$, during the upward displacement of the bobbin chuck 10 from the level $V_2$ to the level $V_3$, the bobbin chuck 10 is displaced from the position $F_2$ to a position $F_3$ where the doffed yarn packages 4 are wrapped by the corresponding film bags, respectively, and the yarn packages 4 are doffed from the respective spindles 1a and thereafter carried to the position $F_3$ in the suspended condition by the respective bobbin chucks 10. Until the completion of this fourth step operation at the time point $t_6$ the mechanism for changing two adjacent bobbin chucks is continuously actuated so as to maintain the pitch $P_1$.

v. Fifth step

In a period $T_4$ between the time point $t_6$ and the time point $t_7$, the wrapping operation in a film bag of each doffed yarn package 4 suspended by the corresponding bobbin chuck is carried out. This wrapping operation will be explained later. During this period, the bobbin chucks 10 are positioned at the level $V_3$ and the position $F_3$, and the mechanism for changing a pitch between two adjacent bobbin chucks 10 is actuated so as to change the pitch from $P_1$ to $P_2$ at the time point $t_6$.

vi. Sixth step

Upon completion of the above-mentioned wrapping operation, the bobbin chucks suspending the full size yarn packages 4 separately wrapped by a film bag are displaced from the position $F_3$ to the position $F_4$ where the bobbin chucks 10 are positioned at positions above the carton 5 and they are displaced from the level $V_3$ to the level $V_4$. According to the above-mentioned motion of bobbin chucks 4, the wrapped full size yarn packages 4 are displaced to the lowermost position from the level $V_3$ to the level $V_4$ and, therefore, the wrapped yarn packages 4 are deposited into the corresponding compartment of the carton 5. On the other hand, the bobbin chuck 10 is released at the time point $t_9$.

vii. Seventh step

At the time point $t_{10}$, when the doffing, film wrapping and depositing operation of the yarn package 4 wrapped with a film bag are completed, the lifting mechanism of the bobbin chucks 10 as well as the forward and backward operation of the bobbin chuck 10 are actuated so as to return to their own original positions.

viii. Eighth step

However, before the time point $t_{10}$, the positions of the bobbin chucks 10 begin to change from the position $F_3$ to the position $F_4$ where the chuck is located at a position right above the carton 5 (time point $t_7$). In the next step of the operation, which starts at the time point $t_8$, the yarn packages 4 wrapped separately with a film bag 52 are deposited into the carton 5 by the downward displacement of the bobbin chucks 10 from the level $V_3$ to the level $V_4$.

ix. Ninth step

When the bobbin chucks 10 holding the yarn packages 4 are displaced to the level position $V_4$ in the carton 5, the bobbin chucks 10 release the gripping of the yarn packages 4 due to the release the air pressure in the chucks 10 so that the gripping force of the bag member 17 of each bobbin chuck 10 is eliminated. This operation is completed at the time point $t_{10}$.

x. Tenth step

At the time point $t_{10}$, the bobbin chucks 10 begin to displace from the level position $V_4$ to the level position $V_1$ and from the position $F_4$ to the standby position $F_1$. These displacing operations of the bobbin chucks 10 are completed at the time point $t_{11}$ and, thus, one unit operation of the doffing and packaging operation for a group of full size yarn packages (in this embodiment, this group consisted of four yarn packages) is completed.

The above-mentioned operation of the successive steps is carried out in a controlled condition by a programing control means (not shown). That is, when the apparatus 2 is firstly positioned at a position corresponding to the first group of four spindles 1a from which four yarn packages 4 are to be doffed, the cable cylinder 41 is actuated to displace the bobbin chucks 10 from the standby position $F_1$ to the position $F_2$, and; when a limit switch No. 1 (not shown), disposed to the apparatus 2 at a position to confirm that the bobbin chuck 10 comes to the position $F_2$, is actuated, the motion of the cable cylinder 41 is stopped by the signal issued from the No. 1 limit switch by way of a change valve No. 1 (not shown) which connects or disconnects the cable cylinder 41 to or from an air supply source (not shown). The above-mentioned No. 1 limit switch also actuates a change valve No. 2 (not shown) which connects or disconnect the cable cylinder 40 to or from the above-mentioned air supply source, so as to change the level of the bobbin chucks 10 from the level $V_1$ to the level $V_2$. A limit switch No. 2 is disposed at such a position that, when the bobbin chucks 10 come to the respective positions for gripping the heads of the bobbins of the respective yarn packages 4, the motion of the cable cylinders 40 are stopped by actuating the change valve No. 2. Therefore, when the limit switch No. 1 issues a signal indicating that the bobbin chucks 10 have arrived at the position $F_2$, the cable cylinders 40 are actuated, and; when the level of the bobbin chucks 10 are changed from the standby level $V_5$ to the level $V_6$, the cable cylinders 40 are stopped. Since a certain time is necessary to complete the taking off of the yarn packages 4 from the respective spindles 1a, timer switches No. 1, No. 2 and No. 3 (not shown) are utilized for delaying the next actuation of the cable cylinders 40, 41 and for maintaining the gripping condition of the bobbin chucks 10, respectively. That is, the timer switch No. 1 is used for maintaining the position $F_2$ for a time $T_1$ until the displacing motion of the bobbin chucks 10 from the level $V_1$ to $V_2$ and $V_2$ to $V_1$ is completed (FIG. 7), while the timer switch No. 2 is used for maintaining the level $V_2$ for a time $T_2$ until the bobbin heads of the respective yarn packages 4 can be firmly gripped by the corresponding bobbin chucks 10. When the set times $T_1$ and $T_2$ are over, the limit switches No. 1 and No. 2 issue signals to actuate the cable cylinders 41 and 40, respectively. On the other hand, when the set time $T_3$ is over, the limit switch No. 3 issues a signal to release the gripping of the yarn packages by the corresponding bobbin chucks. The sequential stepwise motion of these cable cylinders 40 and 41 are carried out by the utilization of limit switches having a similar function to those of the above-mentioned limit switches No. 1 and No. 2, and; the positions or levels of the bobbin chucks 10 at the level $V_3$ for a time $T_4$ and the level $V_4$ for a time $T_7$, the position $F_3$ for a time $T_4$ and the position $F_4$ for a time $T_6$ are maintained by delaying the transmission of the respective signals from these limit switches to the control valves for actuating the respective cable cylinders 40 and 41.

As will be understood from FIG. 7, the displacement of the apparatus 2 from a first group of four spindles 1a of a draw-twister 1 to a second group of four spindles 1a of the draw-twister 1, is carried out after the completion of one cycle of the doffing operation to the first group of spindles in a period between the time point $t_6$ and $t_{10}$. Such running or stop operation is controlled by a control relay (not shown) which is actuated by limit switches which detect the position of the bobbin chucks 10 when they arrive at the positions $F_3$ and $F_4$, respectively, in such a way that the control relay connects or disconnects the driving motor 9a to or from an electric source. In the above-mentioned embodiment shown in FIGS. 1 through 7, a carton 5 is used which has a capacity for packaging eight yarn packages therein in such a condition that these yarn packages 4 are arranged in two alignments, each alignment having four yarn packages. Since one unit operation of the apparatus 2 is carried out for four yarn packages 4, two unit operations must be carried out for making one carton package. Therefore, the depositing operation of four yarn packages into a carton 5 is carried out twice at two different positions of the bobbin chucks 10. That is, in the first depositing operation, the bobbin chucks 10 are positioned at the position $F_4$ and in the next depositing operation, the bobbin chucks 10 is positioned at a position $F_1$ which is identical to the standby position. Since such second depositing operation is carried out in a similar manner to the first depositing operation, the explanation thereof is omitted.

The above-mentioned controlled operations are effectively carried out to each other by a predetermined control program which is carried out by the combination of the above-mentioned limit switches, delay timers, control relays.

B. Mechanism for individual wrapping

The mechanism for individual wrapping to doffed yarn packages 4 held by the respective bobbin chucks 10 is hereinafter explained in detail. This mechanism is disposed in the rear portion of the apparatus of the present invention, namely at a position apart from the spindle alignment of the draw-twister 1.

Figure 8:
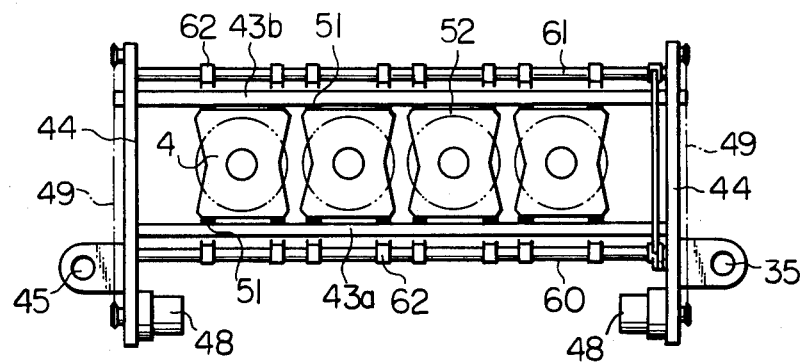
FIG. 8 is a schematic plan view of the film bag holding and opening mechanism utilized for the apparatus shown in FIG. 1.
Figure 9:
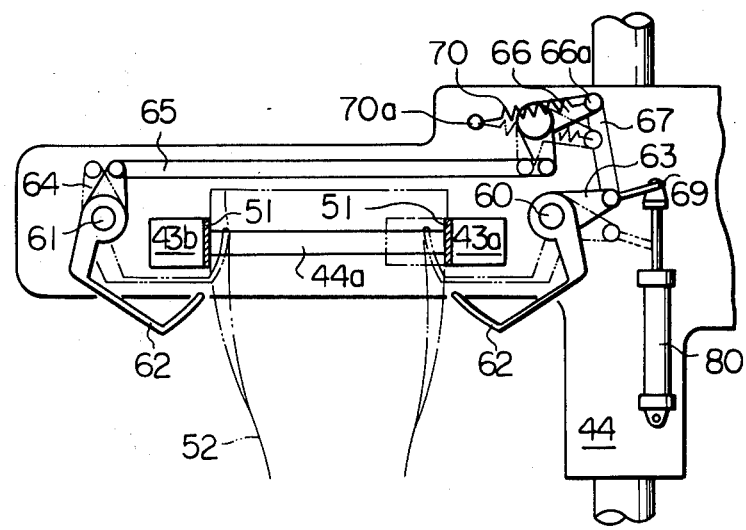
FIG. 9 is a schematic side view of the mechanism shown in FIG. 8.

The lift mechanism of the yarn package wrapping mechanism will now be described by reference to FIGS. 6 and 8.

A pair of holding members 43a and 43b, each consisting of a bar, are supported by brackets 44 in parallel to each other so that the spacing therebetween can be changed. The brackets 44 are disposed in a capable condition of lifting up and brought down along guide rails 45 laid out in the vertical direction as shown in FIG. 6. More specifically, a pair of endless chains 47 driven by a motor 46 are laid out along the guide rails 45 and the brackets 44 are attached to the chains 47. Accordingly, by synchronous movements of the chains 47, the holding members 43a and 43b are lifted up or brought down.

The mechanism for holding and opening film bags in the yarn package wrapping mechanism will now be described by reference to FIGS. 8, 9, 10, 11A and 11B.

Both the ends of the holding member 43a are fixed by the brackets 44, and the other holding member 43b is disposed in such a way that it can be moved in parallel to the holding member 43a in the horizontal direction along guide grooves 44a formed in the respective brackets 44. More specifically, one end of each bracket 44 is connected to a motor 48, and an endless chain 49 driven by the motor 48 is laid out along the moving course of the holding member 43b and both the ends of the holding member 43b are connected to the respective chains 49. Accordingly, the holding member 43b is capable of moving in the horizontal direction by the action of the motors 48 to narrow or broaden the spacing between both the holding members 43a and 43b.

Adhesive faces 51 are formed on the confronting surfaces of the holding members 43a and 43b at the respective positions for holding films. That is, in this embodiment, four pairs of adhesive surfaces 51 are distributed along the inside surfaces of the respective holding members 43a and 43b in such a condition that each pair of the adhesive surfaces 51 of the holding member 43a face those of the holding member 43b and a pair of two adjacent adhesive surfaces 51 of the member 43a are capable of catching a side portion of a film bag 52 positioned in the film bag supply mechanism 50, while a pair of two adjacent adhesive surfaces 51 of the member 43b, which face the above-mentioned adhesive surfaces 51 of the member 43a, are capable of catching the opposite side portion of the above-mentioned film bag 52. The distance $l$ of two adjacent adhesive faces 51 of the member 43a, and the member 43b is sufficiently large to hold the above-mentioned side portion which is a top portion of each gazetts folded film bag 52. As mentioned above, the adhesive faces 51 hold adhesively the top ends of the gazetts-folded film bags aligned in the film bag supply mechanism at pitch $P_2$, along the length $l$ when the spacing between the two adhesive faces 51 of the members 43a and the members 43b is narrowed and closed. When the spacing is broadened the bags 52 are opened so that each film bag 52 is capable of receiving a doffed yarn package 4 therein.

Figure 10:
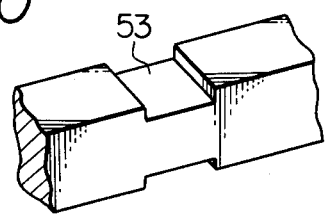
FIG. 10 is a perspective view of a part of the holding members utilized for the mechanism shown in FIG. 8.
Figure 11A:
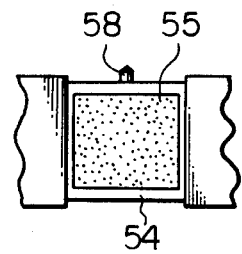
FIG. 11A is a front view of a part of the holding members where the cross-section shown in FIG. 11B is taken.
Figure 11B:
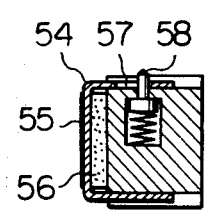
FIG. 11B is a sectional view of the holding member shown in FIG. 11A, taken laterally at the recessed portion thereof.
Figure 12:
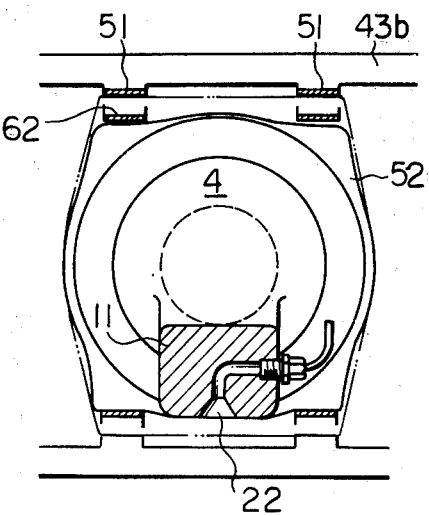
FIG. 12 is a plan view of a bobbin chuck in a relation to a displaceable holding member shown in FIG. 8.
Figure 13:
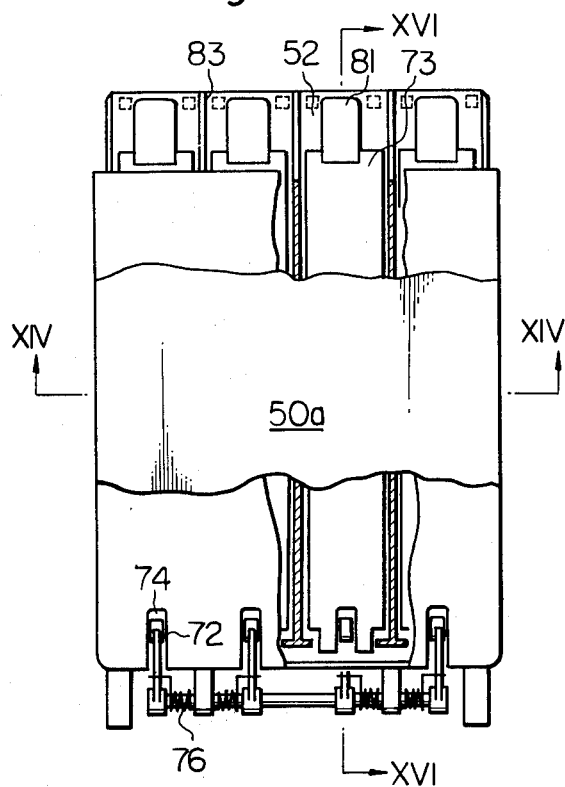
FIG. 13 is a perspective front view of a film bag magazine utilized for the apparatus shown in FIG. 1.

An embodiment of formation of such adhesive face 51 will now be described by reference to FIGS. 10, 11A and 11B.

A step portion 53 is formed at each position of the bar of the holding members 43a, 43b where the adhesive face 51 is to be attached, by shaving the upper and lower faces of the bar of the holding members 43a, 43b t some extent at this position. A mount 54 having a hook-shaped section provided with an adhesive layer 55 is mounted on the step portion 53 through a sponge. A long hole 57 is formed on the top portion of the mount 54 and a pin 58 elastically embedded in the top face of the bar of the holding members 43a, 43b is freely fitted in this long hole 57 to thereby prevent the possible separation of the mount 54 from the bar of the respective holding members 43a, 43b.

By virtue of the above-mentioned construction of the film bag holding and opening mechanism, when the holding members 43a and 43b are brought close to each other, the faces of the film gripped and held between the holding members 43a and 43b are wholly pressed to the adhesive faces 51 by the elastic force of the sponges 56 to ensure complete adhesive holding. When the adhesive layer 55 is consumed away by repeated use, the mount 54 can be replaced by a fresh mount 54 easily.

The film bag 52 held between the holding members 43a and 43b by the above-mentioned mechanism is opened and caused to receive the doffed yarn package 4 held by the corresponding chuck 10 therein from the lower portion of the yarn package 4. Then, the bag 52 is peeled from the holding members 43a, 43b by means of strippers 62. This operation will now be described by reference to FIGS. 8, 9, 11A, 11B and 12.

Shafts 60 and 61 are disposed outwardly of the holding members 43a and 43b in the spaced state, and both the ends of each shaft 60, 61 are rotatably supported by left and right brackets 44. Strippers 62 are fixed to the shafts 60 and 61 as positions corresponding to the adhesive faces 51 of the holding members 43a and 43b. Arms 63 and 64 are fixed to one ends of the shafts 60 and 61, respectively. The arms 63 and 64 are connected to each other through a connecting lever 65, a bell crank 66 attached to the brackets 44 and a connecting lever 67. When an operation lever 69 formed by extending the arm 63 is moved up and down, the shafts 60 and 61 are rotated in directions reverse to each other to swing the strippers 62 fixed to the shafts 60 and 61, whereby the L-shaped top ends of the strippers 62 are forwarded to the front of the adhesive faces 51 from a position below the adhesive faces 51. One end of a spring 70 is fixed to the bracket 44 and the other end of the spring 70 is attached to one end 66a of the bell crank 66. When the stripper 62 is once located at an operation position or standby position, the spring 70 holds the stripper 62 at this position until the operation lever 69 is actuated again. This operation lever 69 is actuated at predetermined intervals by an air cylinder 80 attached to the brackets 44. The above-mentioned operation is carried out sequentially under a control by a programing control mechanism which will be explained later.

After the yarn package 4 has been inserted into the film bag 52 which are maintained in opened condition by means of the above-mentioned holding members 43a and 43b, the strippers 62 work to peel the bag 52 from the adhesive faces 51 for delivering it to the suction aperture 22 formed on the arm 11 so that the adhesive faces 51 are protected from being damaged by the contact of the peeled film bags.

C. Film bag supplying mechanism

The film bag supplying mechanism will now be described by reference to FIGS. 13, 14, 15 and 16.

The film supplying mechanism 50 is disposed just below the above-mentioned mechanism for individual wrapping yarn packages and comprises a film storing box 71 an edge presser 72 and a pressure plate 73. The box 71 involves therein a rectangular parallelpiped container 82 having divided sections 83, the number of which corresponds to the number of yarn packages simultaneously treated (four in this embodiment). Gazette folded film bags 52 are piled in the vertical state in each section 83 and pressed from the back by a pressure plate 73, whereby the bags 52 are held in good order. The container 82 is detachably disposed in the box 71 so that charging of film bags 52 can be facilitated. The front wall of the box 71 has a height completely covering the size of the film bag 52, but the top portion 81 of the pressure plate 73 is shortened to such an extent that the top end of the film bag 52 is exposed. This top portion 81 of the pressure plate 73 is composed of a flexible material, such as a phosphor bronze plate. Slits 74 corresponding to the respective sections 83 are formed in the lower portion of the pressure plate 73 and the edge presser 72 acts through these slits 74. This edge pressure 72 consists of a pressing plate of a small area having a projection 75 formed on one surface thereof and it is arranged so that a pressing force is imposed on the film bags 52 in the vicinity of lower edges thereof through a spring 76.

Figure 15:
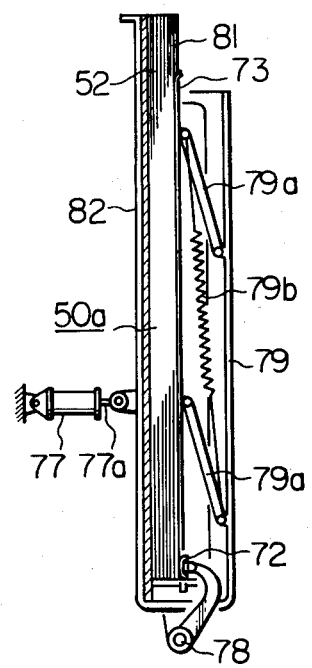
FIG. 15 is a schematic side cross-sectional view of the film bag magazine shown in FIG. 13.
Figure 14:
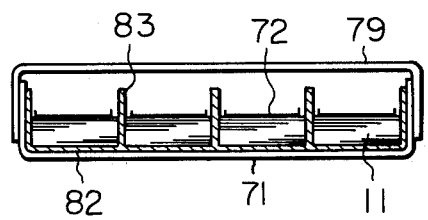
FIG. 14 is a cross-sectional view of the film bag magazine taken along a line XIV—XIV in FIG. 13.
Figure 16:
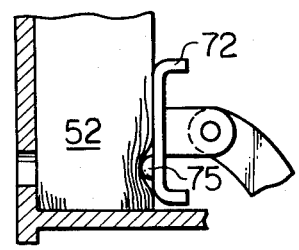
FIG. 16 is a cross-sectional view of a bottom part of the film bag magazine, taken along the line XVI—XVI in FIG. 13.

The box 71 is turnably mounted on a horizontal shaft 78 and connected to a piston rod 77a of an air cylinder 77 turnably mounted on a part of a frame of the apparatus 2. Consequently, the box 71 as a whole can be positioned at a forwardly inclined position or a vertical position by operating the air cylinder 77. An auxiliary plate 79 is disposed behind the container 82 in such a condition that the auxiliary plate 79 is displaceably mounted on the container 82. A pair of pressers 79a are pivotably mounted on the plate 79 and the pressers 79a always press the pressure plate 73 toward the film bags 52 held in the container 82 in the operative condition. These pressers 79a are resiliently connected by a connection means 79b so as to work in cooperative condition. When it is required to supply a predetermined number of film bags 52 into the respective containers 82, the plate 79 is separated from the container 82 so as to make an sufficient space between the wall of the container 82 and the pressure plate 73 for receiving such film bags 52. Thereafter, the plate 79 is mounted on the container 82 as shown in FIG. 15 so that the film bags 52 are pressed by the pressure plate 73.

Instead of applying the above-mentioned method of supplying the film bags 52 into the container 82, it is also applicable to supply the film bags 52 by changing the container 82 wherein the film bags 52 have been supplied thereinto.

The motion of the air cylinder 77 is controlled by a control mechanism 85 provided with an automatic valve 85a for selectively changing the connection of the air chambers of the air cylinder 77 to the air supply source 86, as shown in FIG. 17.

The operation of the mechanism for individual wrapping yarn packages 4 in the respective film bags 52 shown in FIGS. 8, 9, 10, 11A, 11B and 12 in cooperation with the film bag supply mechanism shown in FIGS. 13, 14, 15 and 16 will now be explained.

After completion of the doffing operation by the bobbin chucks 10, the doffed yarn packages 4 (in this embodiment four yarn packages) are carried to the predetermined wrapping positions by displacing the chucks 10. During the above-mentioned displacement of the chucks 10, the distance between each two adjacent bobbin chucks 10 is changed to a predetermined pitch P2 by means of the mechanism for changing the pitch between two adjacent bobbins shown in FIG. 5.

In this condition, the holding members 43a and 43b are set at the lowermost position in the opened state, and the film bag storing box 71 is set at the forwardly inclined position. In this positional relationship, the holding members 43a and 43b are in the state wherein the top end of the film bag 52 is caught therebetween.

Figure 18A:
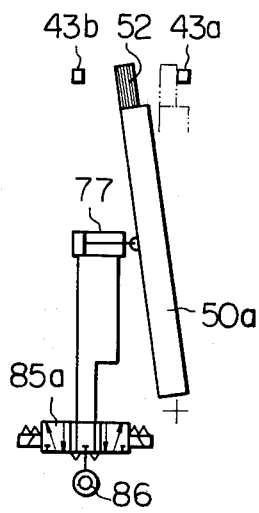
Figure 18B:
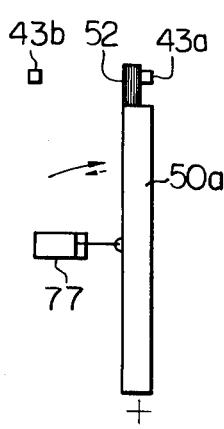
Figure 18C:
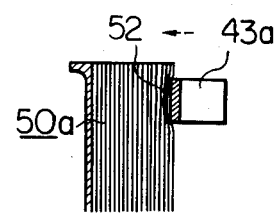

The wrapping operation of the above-mentioned yarn packages 4 by the respective film bags 52 is hereinafter explained in detail with reference to FIGS. 17, 18A, 18B, 18C, 18D, 18E, and 18F. For the sake of a better understanding of the present invention, in the following explanation, the operation of wrapping one doffed yarn package 4 by a film bag 52 is explained.

i. First step (FIGS. 18A, 18B and 18C)

Figure 18D:
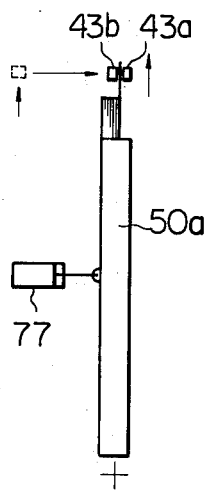

The film magazine 50a is moved from the outwardly inclined position to the vertical position, whereby the rear faces of the top ends of the film bags 52 stored in the box 71 contact and press against the holding member 43a. By this operation, in each section of the box 71, the film bag 52 located at the rear end is stuck to the adhesive face of the holding member 43a, and immediately thereafter, the pressing is released and the apparatus is ready for the next step. This first step operation is carried out at a position $V_5$ indicated in FIG. 17.

ii. Second step (FIG. 18D)

Figure 18E:
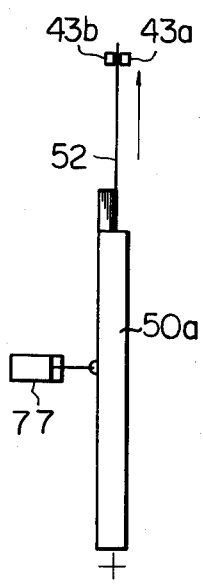

The holding members 43a and 43b are slightly lifted up and each film bag 52 located at the rear ends of the respective sections of the film magazine 50a are pulled out. At this point, the holding member 43b begins the movement and comes close to the other holding member 43a, whereby the film bag 52 is completely gripped and held therebetween. This second step operation is carried out at a position $V_6$ indicated in FIG. 17.

iii. Third step (FIG. 18E)

Figure 18F:
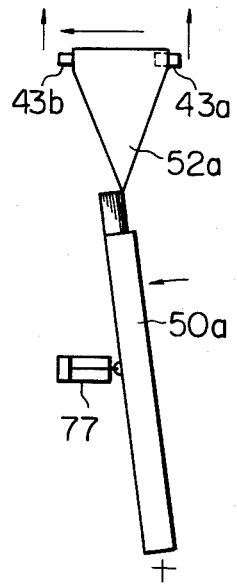

The holding members 43a and 43b are further lifted up to lift up the film bag 52 sufficiently to form an opening for receiving the yarn package therein. In this stage, the film bag 52 is already set free from the operation of the edge presser 72 (FIG. 15) and it undergoes only the pressing action of the pressure plate 73 (FIG. 15), while the pressing force of the edge presser 72 (FIG. 15) is still imposed on the remaining bags in the magazine 50a. Accordingly, even if a frictional force acts on the film bag 52 when it is pulled up, regular alignment of the film bags 52 in each section of the magazine 50a is not disturbed at all.

iv. Fourth step (FIG. 18F)

When the film bag 52 is lifted up to the vicinity of the lower end of the yarn package 4 suspended from the corresponding bobbin chuck 10, the holding member 43b is shifted in a direction separating it from the holding member 43a to open the film bag 52. Prior to this bag opening operation, the bag storing magazine 50a is returned to the forwardly inclined position so that the section of the opened film bag 52 forms a substantially equilateral triangle 52a having the top end of the magazine 50a as the vertex of the triangle 52a. When the bag storing box 50a is kept in such forwardly inclined state, the holding of the film bag 52 by the adhesive faces 51 (FIG. 12) has a great resistance to the force in the shearing direction of the adhesive faces 51 but the resistance to the peeling force acting in the direction to the adhesive faces 51 is relatively low and, therefore, at the subsequent step, the resistances on both the adhesive faces 51 of the holding members 43a and 43b are well-balanced with each other when the bag 52 is pulled out. At this step, the upper portion 73a (FIG. 15) of the pressure plate (73) is readily bent outwardly by the film bag 52 and the operation is performed very stably. This fourth step operation is carried out at a position $V_7$ indicated in FIG. 17.

v. Fifth step

The holding members 43a and 43b are further lifted up and the yarn package 4 is completely wrapped in the film bag 52. At this point, the holding members 43a and 43b are stopped and the stripper 62 is actuated to peel the film bag 52 from the adhesive faces 51, whereby the film bag 52 is released from being held by the holding members 43a and 43b. Simultaneously, the stripper 62 thrusts the film bag 52 toward the arm 11, and the film bag 52 is held by the attractive suction force from the attracting aperture 22 of the arm 11. This fifth step operation is carried out at a position $V_8$ shown in FIG. 17. In FIG. 17 arrows $d_1$ indicates the upward displacement of the holding members 43a and 43b, respectively while arrows $d_2$ indicate the downward displacement of the holding members 43a and 43b respectively.

vi. Sixth step

The holding members 43a and 43b are brought down along the guide rails 45 (FIGS. 2, 3 and 6) and returned to the lowermost position. While the holding members 43a and 43b are being brought down, the stripper 62 masks the adhesive faces 51. Accordingly, falling of the film bag 52 because of contact with the adhesive faces 51 can be prevented.

Figure 19:
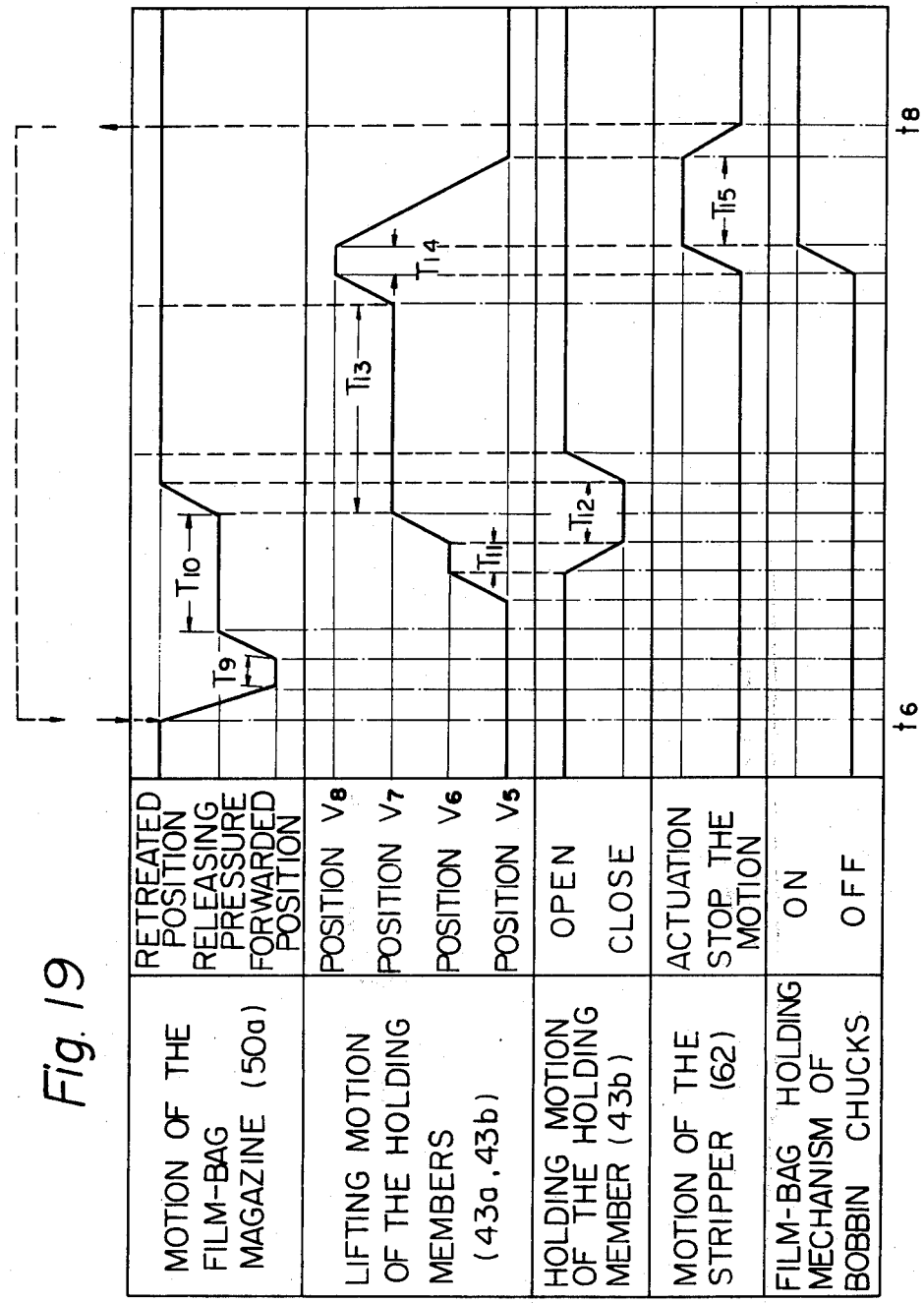
FIG. 19 is a chart indicating the programming of the motions of the film bag supply magazine and the related motions thereof which are applied for separately wrapping the doffed yarn packages by a film bag, according to the present invention.

The above-mentioned stepwise operations, from the first step to the sixth step, for wrapping the doffed yarn packages 4 being held by the respective bobbin chucks 10, is carried out during a period between the time point $t_6$ and the time point $t_8$ in the cycle of the displacing operation of the bobbin chucks 10 (FIG. 7). The relative operations of the film bag magazine 50a, the holding members 43a and 43b, the strippers 62, the film-bag holding mechanism of bobbin chucks 10 are carried out in a predetermined sequential program therefor as illustrated in FIG. 19. The above-mentioned sequential program is carried out by a control mechanism (not shown) having limit switches, delay timers having similar functions to the limit switches, delay timers utilized for the control mechanism utilized for controlling the motion of the bobbin chucks 10 and, therefore, a detailed explanation thereof is omitted. In the program shown in FIG. 19, periods indicated by $T_9$, $T_{10}$ represent periods wherein the film bag magazine 50a is maintained at the forwarded position and in the condition of releasing pressure respectively, while the retreated position thereof, indicated in FIG. 19, is a standby position; periods indicated by $T_{11}$, $T_{13}$ and $T_{14}$ represent periods wherein the holding members 43a and 43b are positioned at the levels $V_6$, $V_7$ and $V_8$, respectively; the period indicated by $T_{12}$ represents a period wherein the holding member 43b is maintained in the closed position, the open position being the standby position, and; the period indicated by $T_{15}$ represents a period wherein the stripper 62 is working. Therefore, the delay timers (not shown) work to maintain the respective members for the above-mentioned periods, respectively. When the motion of the stripper 62 is completed at the time point $t_8$, the mechanisms for wrapping the doffed yarn packages suspended by the corresponding bobbin chucks 10 are maintained at their standby conditions until these mechanisms are actuated by a signal issued from a limit switch (not shown) which detects that the bobbin chucks 10 have arrived at the position $F_3$ at the level $V_3$ (FIG. 2).

D. Carton positioning mechanism

The mechanism for positioning the carton at the position for receiving yarn packages wrapped with film bags is hereinafter explained in detail.

As pointed out hereinbefore, in the method of the present invention, it is necessary to set an empty carton at a predetermined position and discharge a carton filled with a predetermined number of yarn packages 4 from the operation system. Since an empty carton is light in the weight, it can easily be handled manually, but a filled carton ordinarily has a weight of about 40 kg or more and some means or other must be used to perform delivery of a filled carton. Examples of such delivery means will now be described.

Figure 20:
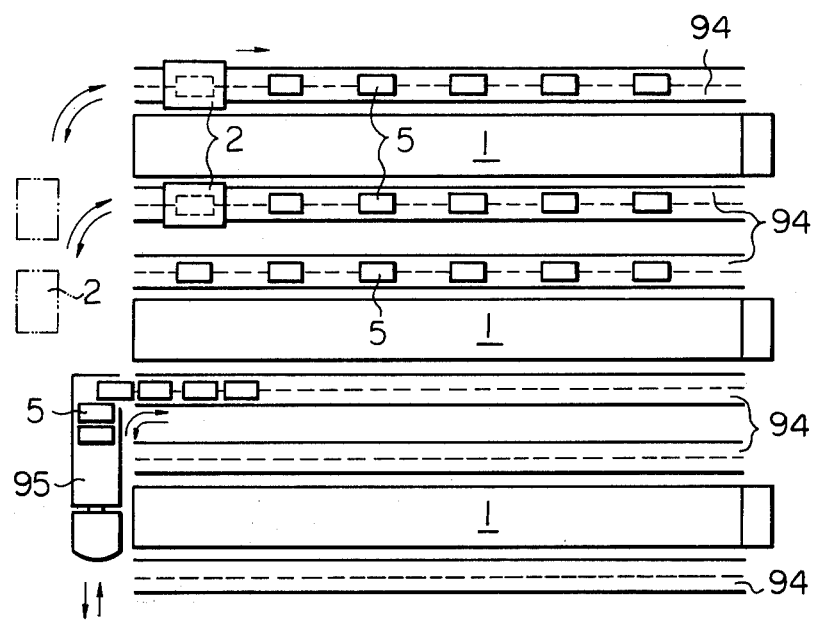
FIG. 20 is a schematic plan view of the installation of a plurality of apparatus shown in FIG. 1, applied for a factory provided with a plurality of draw-twisters.

In FIGS. 1 and 20, a typical example of the above-mentioned carton positioning mechanism is shown. Conveyers 94 are laid out along spindle alignments on both the sides of a draw-twister 1 in parallel to each other. The apparatus 2 of the present invention is designed so that during operation, when the apparatus 2 travels over the conveyers 94 and in other passage, it can be freely moved. Namely, the apparatus 2 of the present invention is arranged so that it can perform the above-mentioned operations on a plurality of draw-twisters.

A truck 95 is used as means for delivering cartons 5 from a carton store area to the end of the draw-twister 1 or from the end of the draw-twister 1 to the subsequent step. The truck 95 is brought alongside in the terminal portions of the conveyers 94 to deliver an empty carton 5 onto the conveyers 94 or discharge a filled carton 5 from the conveyers 94.

Empty boxes 5 are carried to the respective standby positions on the conveyers 94 in the lid-opened state one by one at a pitch which corresponds to the doffing pitch, whereby the packaging operation can be performed at high efficiency. In the above-mentioned operation to position the cartons at correct positions for carrying out the operation of the apparatus 2, a stopper (not shown), which works to correctly position an empty carton at the position for receiving the yarn packages, is disposed in the apparatus. Such type of stopper, that the stopper is capable of projecting to the carrying passage of the conveyor 94 or retreating into the apparatus 2 from the carrying passage of the conveyer 94, is utilized. In this case, the stopper is projected from the apparatus when an empty carton is required to be positioned for carrying out the operation of the apparatus 2, on the other hand, when it is required to discharge a carton filled with doffed yarn packages from the apparatus 2, the stopper is retreated into the apparatus. Such motions of the stopper is carried out by means of a pneumatic cylinder or solenoid which are well known in the art, therefore the detailed explanation thereof is omitted. After completion of the doffing operation, the cartons are gathered at the terminal portions of the conveyers 94 and loaded on the truck 95.

A roller conveyer having no driving device may be used as the above-mentioned conveyer, but a power conveyer capable of normal rotation and reverse rotation is preferably adopted because manual labor can be saved in the operations of delivery and discharge of cartons. Further, if the pitch of the intermittent normal and reverse rotations of such power conveyer is made to agree with the pitch of the operations in the apparatus, yarn packages can be packaged into a plurality of line sections of a carton without the aid of workers.

Figure 21:
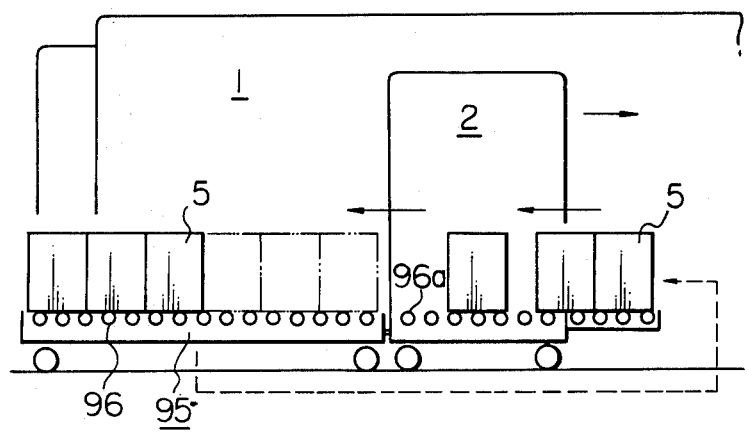
FIG. 21 is a schematic side view of an application of the apparatus shown in FIG. 1 to a draw-twister by utilizing a different type conveyor.

Another example of the carton positioning mechanism will now be explained with reference to FIG. 21.

As means for delivery and discharge of cartons, a truck having a roller conveyer 96 built therein is employed. A prescribed number (1/8 of the number of spindles of the draw-twister) of empty cartons 5 are loaded in a line on the truck 95 and delivered to one end of the draw-twister 1. A roller conveyer 96a is disposed also in the apparatus 2 of the present invention in such a construction that it penetrates both the end frames of the apparatus 2. Both the conveyers 96 and 96a are arranged on the same level so that they can form a single conveyor. Prior to the doffing operation, the truck 95 is connected to the rear end of the apparatus 2, several empty cartons 5 are pushed onto the roller conveyer 96a built in the apparatus 2 from the front portion thereof and the first empty carton 5 is set at the packaging position. Then, the doffing operation is started, and when the carton is filled with yarn packages, it is pushed out from the rear end of the apparatus 2 and delivered onto the truck 95. Thus, the empty cartons 5 are filled with yarn packages and delivered onto the truck 95 one by one. Since the apparatus 2 is advanced while dragging the truck 95 as the above operation proceeds, both the conveyers 96 and 96a are always kept the state connected to each other and delivery of filled cartons 5 can be performed smoothly and conveniently.

While the above-mentioned operation is repeated, the apparatus 2 arrives at the other end of the draw-twister, and when the operation is thus completed, the truck 95 is in the state where filled cartons are loaded thereon. Then, the truck 95 is separated from the apparatus 2 and is moved to deliver the filled cartons to a predetermined position.

Figure 22A:
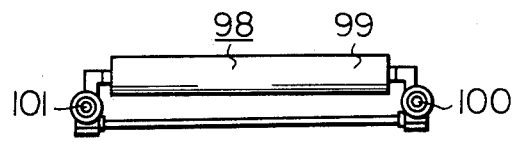
FIG. 22A is a schematic front view of a different type of conveyor which is capable of being applied to the apparatus according to the present invention.
Figure 22B:
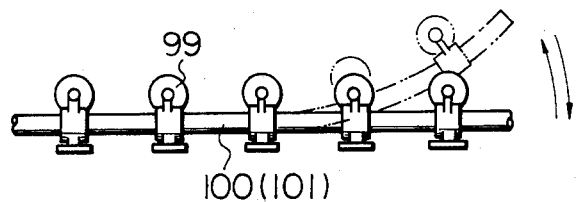
FIG. 22B is a schematic side view of the conveyor shown in FIG. 22A.
Figure 22C:
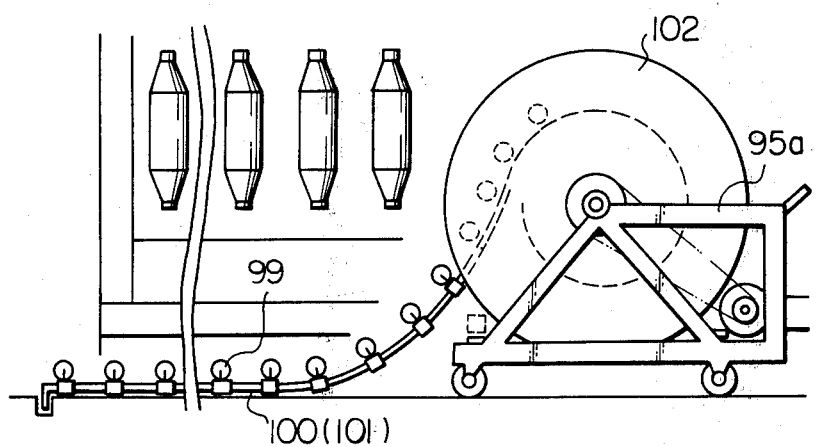
FIG. 22C is a schematic side view of the other part of the conveyor shown in FIG. 22A.

A further embodiment of the conveyer system applied to the present invention will now be explained with reference to FIGS. 22A, 22B and 22C.

In the first embodiment, mentioned above, since conveyers are always set at both sides of the draw-twister, it sometime happens that the watching operation or inspection by a worker is hindered by such conveyers. In this embodiment, in order to eliminate this disadvantage, dismountable conveyers 98 are arranged on the side faces of the draw-twister every time the doffing operation is carried out, and they are removed from those positions when the doffing operation is completed. The structure of this dismountable conveyer 98 is illustrated in FIGS. 22A, 22B and 22C. It comprises a plurality of rollers 99 spanned between a pair of flexible rubber ropes 100 and 101 and wound on a reel 102 in the compact state. This conveyer is loaded on a truck 95a so that it can be transported with ease. In this embodiment, by the use of such conveyer, a sufficient empty space can be taken at the position in front face of the draw-twister and this space can be utilized effectively for manual operation for the other purposes beside the doffing operation.

As will be apparent from the foregoing illustration, the yarn package packaging method and apparatus of the present invention can be constructed very simply and compactly, and the packaging operation can be performed subsequent to the doffing operation in the vicinity of the draw-twister. Accordingly, manual labor and operation space can be remarkably saved. Further, the stock of unpackaged yarn packages can be greatly reduced. Therefore, the present invention makes great contributions to the art.

What is claimed is:

1. Method for packaging in a carton full size yarn packages produced by a yarn producing machine provided with a plurality of yarn producing units, each unit provided with a spindle for supporting a bobbin for forming said yarn package, said spindles aligned along a longitudinal direction of said yarn producing machine, comprising in combination of doffing said full size yarn packages by means of a plurality of bobbin chucks:
   a first step of positioning said carton at a predetermined position adjacent to a group of said spindles whereon full size yarn packages are supported;
   a second step of simultaneously doffing a plurality of said full size yarn packages by said bobbin chucks from respective spindles of said group;
   a third step of simultaneously displacing said doffed yarn packages supported by the respective bobbin chucks from the respective positions for carrying out said doffing operation to respective positions removed from said group of spindles;
   a fourth step of simultaneously wrapping each of the doffed yarn packages supported by the corresponding bobbin chuck with a film bag, while positioning said bobbin chucks at said removed positions;
   a fifth step of displacing said bobbin chucks from said removed positions toward the respective releasing positions right above a receiving space in said carton and depositing said wrapped yarn packages into said carton;
   an intermediate step of changing a pitch between two adjacent bobbin chucks of said group of bobbin chucks from a spindle pitch between two adjacent spindles of said spindle alignment to a predetermined distance selected for packaging, just before carrying out said fourth step operation or said fifth step operation;
   a sixth step of releasing the grip of said bobbin chucks and displacing said bobbin chucks from said releasing positions upward to the respective standby positions of said bobbin chucks;
   a seventh step of discharging said carton filled with said wrapped yarn packages from said predetermined position;
   said operations from said first step to said seventh step are successively carried out until the doffing operation of full sized yarn packages is completely carried out with respect to all spindles of a spindle alignment of said yarn producing machine.

2. Method for packaging full size yarn packages produced by a yarn producing machine according to claim 1, further comprising, repeating the carrying out of seven successive steps consisting of said first step, second step, third step, fourth step, intermediate step, fifth step and sixth step, as a cycle at least once, an additional step of changing said removed position in such a way that said removed position coincides with a position right above said space for receiving said yarn packages wrapped by a film bag.

3. Method for packaging full size yarn packages produced by a yarn producing machine according to claim 2, wherein said successive stepwise operations are carried out automatically according to a predetermined control program.

4. Method for packaging full size yarn packages produced by a yarn producing machine according to claim 2, further comprising an auxiliary step for preparing a plurality of film bags for carrying out said fourth step operation, said auxiliary step comprises simultaneously and automatically picking up said film bags in separated condition from the respective supply sources thereof, then, opening a mouth of each film bag picked up from respective supply sources and, thereafter, displacing said film bags to the respective positions for carrying out said fourth step operation.

5. Method for packaging full size yarn packages produced by a yarn producing machine according to claim 1, wherein said successive stepwise operations are carried out automatically according to a predetermined control program.

6. Method for packaging full size yarn packages produced by a yarn producing machine according to claim 1, further comprising an auxiliary step for preparing a plurality of film bags for carrying out said fourth step operation, said auxiliary step comprises simultaneously and automatically picking up said film bags in separated condition from the respective supply sources thereof, then, opening a mouth of each film bag picked up from respective supply sources and, thereafter, displacing said film bags to the respective positions for carrying out said fourth step operation.

7. Apparatus for packaging in a carton full size yarn packages produced by a yarn producing machine provided with a plurality of yarn producing units, each unit provided with a spindle for supporting a bobbin for forming a yarn package, said spindles aligned along a longitudinal direction of said yarn producing machine, comprising in combination,
 means for correctly positioning said apparatus at predetermined working positions for carrying out each doffing operation by said apparatus,
 a group of bobbin chucks for doffing full size yarn packages from a group of said spindles facing said group of bobbin chucks respectively,
 means for supporting said bobbin chucks in a condition whereat they are capable of changing a pitch between each two adjacent bobbin chucks of said group of bobbin chucks,
 means for separately wrapping said full size yarn packages, each supported by a corresponding bobbin chuck, in individual film bags respectively,
 means for temporarily positioning said carton at a position for simultaneously receiving wrapped yarn packages,
 means for displacing said supporting means from a position for carrying out said doffing operation to several working positions of said apparatus, which involve a position for simultaneously, individually wrapping each said doffed yarn package supported by a corresponding bobbin chuck in said film bag, a position for depositing said wrapped yarn package in a predetermined space in said carton and a position for maintaining said bobbin chucks in a standby condition thereof,
 said supporting means provided with means for changing a pitch between each two adjacent bobbin chucks from a spindle pitch of said spindle alignment to a pitch for packaging.

8. Apparatus for packaging in a carton full size yarn packages produced by a yarn producing machine according to claim 7, wherein said means for supporting said group of bobbin chucks comprises in combination with said pitch changing means, a horizontal bracket provided with a pair of horizontal arms facing each other, a horizontal rod supported by said horizontal arms, a group of bosses slidably mounted on said horizontal rod in spline engagement, each of said bosses provided with a bobbin chuck holding arm projected therefrom, means for restricting the sliding motion of said bosses along said horizontal rod in such a condition that a pitch of each two adjacent bobbin chucks held by said bobbin chuck holding arms is selectively fixed at a pitch identical to a spindle pitch or a pitch identical to a packaging pitch in said carton alternatively, means for selectively displacing said bosses along said horizontal rod.

9. Apparatus for packaging in a carton full size yarn packages produced by a yarn producing machine according to claim 8, wherein said bobbin chuck holding arm is provided with a suction aperture connected to a suction air source so that a film bag can be caught thereby.

10. An apparatus for packaging in a carton full size yarn packages produced by a yarn producing machine according to claim 8, wherein said means for selectively displacing said bosses is a pneumatic control cylinder provided with double pistons which are capable of displacing in opposite directions to each other, a piston rod is connected to each of said pistons, one of said piston rods being connected to said bobbin chuck holding arm positioned at one position outside of said bobbin chuck alingment, the other of said piston rods being connected to said bobbin chuck holding arm positioned at another position outside of said bobbon chuck alignment, each of said bobbin chuck holding arms is provided with an additional rod projected therefrom toward an adjacent bobbin chuck holding arm in parallel condition to said piston rod, said additional rod is slidably engaged in a guide aperture formed in said adjacent bobbin chuck holding arm, each of said additional rods is provided with an expanded terminal head so that each of said adjacent bobbin chuck holding arms is capable of displacing outward by contacting said terminal head of said additional rod with the corresponding adjacent bobbin chuck holding arm when said piston rod is displaced outward from said pneumatic cylinder and, on the other hand, each of said adjacent bobbin chuck holding arms is capable of displacing toward the approached position restricted by said restricted means when each of said bosses positioned at the respective outside positions of said bobbin chuck alignment pushes an insidely adjacent boss by retraction of said piston rods into said pneumatic cylinder.

11. Apparatus for packaging in a carton full size yarn packages produced by a yarn producing machine according to claim 7, wherein said bobbin chuck comprises a cylindrical cap composed of a material having a high rigidity, an annular press lid fitted in the bottom end of said cap and a bag member provided with a bottom flanged portion thereof rigidly supported between said cap and said press lid so that an inner circumferential face of said cap is closely covered, said cap provided with an aperture connected to an air supply source by way of a conduit formed in said bobbin chuck holding arm.

12. Apparatus for packaging in a carton full size yarn packages produced by a yarn producing machine according to claim 7, wherein said means for displacing said supporting means comprises a pair of horizontal guide rails facing each other, each guide rail provided with a horizontal guide groove formed in the side facing the other guide groove in such a condition that said guide grooves are capable of slidable engagement with said supporting means, a cable cylinder disposed on each of said horizontal guide rails in parallel condition thereto, said cable cylinder provided with an endless chain connected to said means for supporting said group of bobbin chucks, two pairs of guide pillars vertically and symmetrically disposed to said apparatus in such a condition that one pair of guide pillars are positioned at a front side while the other pair of guide pillars are positioned at a back side of said apparatus, and the interval between said front pair of guide pillars and said back pair of guide pillars permits the arrangement of said guide rails therein, a cable cylinder vertically and rigidly mounted to said apparatus in parallel condition to each front guide pillar at an adjacent position thereto, each guide rail provided with a pair of sliding brackets slidably mounted on corresponding guide pillars, each cable cylinder provided with an endless chain connected to one of said guide rails.

13. An apparatus for packaging in a carton full size yarn packages produced by a yarn producing machine according to claim 7, further comprising means for automatically controlling operations of component members in a predetermined program.

14. Apparatus for packaging in a carton full size yarn packages produced by a yarn producing machine according to claim 7, wherein said wrapping means comprises a film bag magazine provided with a plurality of chambers the number of which is identical to the number of said bobbin chucks, and the pitch of the lateral alignment of said chambers is identical to said pitch for packaging said yarn packages, means for catching film bags one by one from each chamber wherein a plurality of fresh film bags are reserved, means for simultaneously opening a mouth of said film bags caught by said catching means while they are being caught by said catching means, means for displacing said catching means to a position for wrapping said doffed yarn packages suspended from said bobbin chucks.

15. Apparatus for packaging in a carton full size yarn packages produced by a yarn producing machine according to claim 14, wherein said catching means in combination with said opening means comprises a pair of brackets facing each other, each bracket provided with a horizontal guide groove, a stationary holding member rigidly supported by said brackets in a horizontal condition, a displaceable holding member slidably engaged in said horizontal guide grooves of said brackets in a facing condition to said stationary holding member, said stationary holding member provided with a plurality of adhesive faces arranged with a pitch which is identical to the pitch of said chambers, said displaceable holding member provided with a plurality of adhesive faces arranged in facing condition to said adhesive faces of said stationary holding member respectively, each bracket provided with a driving motor and an endless chain means driven by said driving motor, said displaceable holding member connected to both of said endless chain means so that said displaceable holding member is capable of contacting said stationary holding member, each of said brackets further provided with means for peeling the film bags caught by said adhesive faces from said adhesive faces of said holding members.

16. Apparatus for packaging in a carton full size yarn packages produced by a yarn producing machine according to claim 15, wherein said displacing means comprises a pair of guide pillars vertically mounted to said apparatus whereon said brackets are slidably supported, a pair of driving motors disposed at positions adjacent to said guide pillars respectively, an endless chain means disposed to said apparatus at positions adjacent to said guide pillars respectively in parallel condition thereto, each of said brackets connected to corresponding endless chain means.

* * * * *